(12) United States Patent
Guo et al.

(10) Patent No.: US 9,407,559 B2
(45) Date of Patent: Aug. 2, 2016

(54) DISCOVERING STABLE ROUTES IN WIRELESS NETWORKS

(71) Applicant: Mitsubishi Electric Research Laboratories, Inc., Cambridge, MA (US)

(72) Inventors: Jianlin Guo, Newton, MA (US); Xin Yang, Mountain View, CA (US); Philip Orlik, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 189 days.

(21) Appl. No.: 14/033,582

(22) Filed: Sep. 23, 2013

(65) Prior Publication Data

US 2015/0085668 A1    Mar. 26, 2015

(51) Int. Cl.
*H04L 12/26*   (2006.01)
*H04L 12/815*  (2013.01)
*H04W 40/14*   (2009.01)

(52) U.S. Cl.
CPC .......... *H04L 47/225* (2013.01); *H04L 43/0894* (2013.01); *H04W 40/14* (2013.01)

(58) Field of Classification Search
USPC ......... 370/229, 230, 232, 235, 236, 238, 248, 370/252, 351, 352, 389
See application file for complete search history.

(56) References Cited

U.S. PATENT DOCUMENTS

| | | | | |
|---|---|---|---|---|
| 8,238,367 B1* | 8/2012 | Choi | ............... | H04L 5/0007 370/235 |
| 2005/0286426 A1* | 12/2005 | Padhye | ............... | H04L 45/00 370/238 |
| 2007/0195702 A1* | 8/2007 | Yuen | ............... | H04L 45/121 370/238 |
| 2008/0212482 A1* | 9/2008 | Nakayma | ............... | H04L 47/10 370/237 |
| 2009/0168653 A1* | 7/2009 | St. Pierre | ............... | H04L 45/00 370/238 |
| 2010/0034143 A1* | 2/2010 | Cordeiro et al. | ............... | 370/328 |
| 2011/0164527 A1* | 7/2011 | Mishra | ............... | H04L 45/123 370/252 |
| 2011/0228696 A1* | 9/2011 | Agarwal | ............... | H04L 41/12 370/253 |
| 2012/0035848 A1* | 2/2012 | Yonezawa et al. | ............... | 701/414 |
| 2012/0078931 A1* | 3/2012 | Jaquette | ............... | H04N 21/2181 707/758 |
| 2013/0121331 A1 | 5/2013 | Vasseur et al. | | |
| 2014/0095864 A1* | 4/2014 | Dasgupta | ............... | H04L 45/64 713/155 |
| 2014/0257926 A1* | 9/2014 | Rasband | ............... | 705/7.31 |
| 2015/0023174 A1* | 1/2015 | Dasgupta | ............... | H04L 47/24 370/236 |
| 2015/0029863 A1* | 1/2015 | Lai | ............... | H04L 47/12 370/237 |

OTHER PUBLICATIONS

Liu et al. "Load Balanced Routing for Low Power and Lossy Networks," IEEE WCNC, 2013.
Yoneyama et al. "Wireless Mesh Network Communication Unit for Smart Meters Enabling Low-Cost and Stable Communication in Smart Grid Systems," Toshiba Corporation, 2012.

(Continued)

*Primary Examiner* — Kwang B Yao
*Assistant Examiner* — Nguyen Ngo
(74) *Attorney, Agent, or Firm* — Gene Vinokur; James McAleenan; Hironori Tsukamoto

(57) ABSTRACT

A method discovers routes for forwarding packets from source nodes (sources) to sink nodes (sinks) in a wireless network, wherein some neighboring sources act as relay nodes. Each source measures a rate of receiving control messages from each neighboring node. Then, the data packets are forwarded from a particular source to the sink via the neighboring nodes having a lowest rate.

10 Claims, 10 Drawing Sheets

(56) References Cited

OTHER PUBLICATIONS

Khan "Performance and Route Stability Analysis of RPL Protocol," KTH Royal Institute of Technology, 2012.

Ancillotti et al. "The Role of the RPL Routing Protocol for Smart Grid Communications," IEEE Communications Magazine, vol. 51 No. 1, 2013).
Accettura et al, "Performance Analysis of the RPL Routing Protocol," IEEE ICM, 2011.

* cited by examiner

DISCOVERING STABLE ROUTES IN WIRELESS NETWORKS

FIELD OF THE INVENTION

This invention relates generally to routing packets in wireless networks, and particularly to discovering stable routes in multi-hop low power and lossy networks.

BACKGROUND OF THE INVENTION

Low-power and lossy networks (LLNs) are important in a wide range of communication applications, such as advanced metering infrastructure (AMI), industrial automation, building and some automation, and environment monitoring. Several Internet Engineering Task Force (IETF) Working Groups (WGs) have been working on IPv6 based standards for LLNs. The 6LoWPAN (IPv6 over Low-power Wireless Personal Area Networks) WG has published six standards, including neighboring node discovery and header compression for LLNs. The ROLL (Routing Over LLNs) WG has completed eleven standards including IPv6 Routing Protocol for LLNs (RPL) and routing metrics used for path determination in LLNs. The CoRE (Constrained RESTful Environment) WG is publishing Constrained Application Protocol (CoAP). Many other standards are under development. ZigBee Alliance and IPSO (Internet Protocol for Smart Objects) Alliance are implementing protocol stack and performing interoperability testing. Industrial deployments of LLNs are also in progress.

In LLNs, nodes and communication links are severely constrained. Nodes operate with resource constrains on processing power, memory, power consumption, and the like. TWO classes of constrained nodes are defined. A class 1 node has about 10 kB (kilobytes) RAM and 100 kB ROM, and a class 2 node has about 50 kB RAM and 250 kB ROM. The communication links between the nodes can be characterized by a high loss rate, low data rate, instability, low transmission power, and short transmission range. There can be from a few dozen up to millions of nodes within a practical LLN. Nodes in LLNs are typically deployed in extended outdoor and indoor environments. Due to the extremely constrained resources and large scale deployment, LLN nodes typically form wireless mesh network and communicate in a multi-hop manner.

In contrast with other networks, the LLNs can also have constrained traffic pattern. Multipoint-to-point, e.g., from nodes inside the LLN towards a central control or data concentrator node, traffic is dominant. The point-to-multipoint, e.g., from a central control node to a subset of nodes inside the LLN, traffic is less common. The point-to-point, e.g., between nodes in the LLN, traffic is rare. Control node in the LLN usually acts as data sink and collects data from all other nodes in LLNs.

Data collection in LLNs such as smart meter networks is required to have high reliability. However, LLN by itself is a constrained node network. This presents challenges to routing procedures. Conventional peer-to-peer routing protocols, such as AODV (Ad-hoc On-demand Distance Vector) and DSR (Dynamic Source Routing) are not suitable for routing in LLNs. As a result, the IETF ROLL WG has developed RPL as a routing protocol to accomplish multipoint-to-point traffic dominant routing in LLNs.

The performance of RPL has been evaluated and analyzed in "Performance Analysis of the RPL Routing Protocol" by Accettura et al, IEEE ICM, 2011. They conclude that RPL exhibits fast network setup. In "The Role of the RPL Routing Protocol for Smart Grid Communications," IEEE Communications Magazine, Vol. 51 No. 1, 2013), Ancillotti et al. state that RPL shows good scalability, but may suffer from severe unreliability due to suboptimal route selection. In "Performance and Route Stability Analysis of RPL Protocol," KTH Royal Institute of Technology, 2012, Khan demonstrates that frequent route change has negative impact on the performance, of RPL.

U.S. Publication 20120099587 describes an opportunistic method to improve RPL reliability. A node transmits a data packet to multiple parent nodes of the same rank and the parent performs channel access to determine if the data packet has been forwarded by parents of siblings. If not, the parent forwards the data packet towards the sink. If yes, the parent drops a local copy of the data packet. However, issues with this method include redundancy and communication overhead. If two sibling parents are not within radio range, at least two copies of same data packet are forwarded to the sink. Transmission of same packet along multiple paths increases communication overhead and the probability of interference with other transmission.

The reliability of the RPL can be improved by selecting optimal routes. To select optimal routes, the key is to select proper routing metrics, e.g., a hop count. However, a short route may be composed of low quality links and therefore, does not necessarily provide high reliability. The IETF standard RFC 6551 defines routing metrics for RPL including hop count, link quality, etc. Other metrics are also proposed for RPL. For example, In "Wireless Mesh Network Communication Unit for Smart Meters Enabling Low-Cost and Stable Communication in Smart Grid Systems," Toshiba Corporation, 2012, Yoneyama et al. describe using the received signal strength and retransmission rate as the metrics for RPL to achieve low cost and stable communication in smart grid systems. In "Load Balanced. Routing for Low Power and Lossy Networks," IEEE WCNC, 2013, Liu et al. describe a workload based metric to improve reliability of RPL. However, a stability based metric is still missing.

Discovering stable routes is very important in LLNs because stable routes persist for a long time. Short term routes in the wireless networks make the network topology unstable. Unstable routes can be caused by unpredictable occurrences of obstacles, unpredictable signal interference, etc.

Stability based routing metric provides numerous benefits to LLNs, such as improving network reliability, reducing communication overhead, mitigating interference, increasing bandwidth utilization, increasing energy efficiency, and prolonging network operating duration, especially for battery-powered networks. With stable routes, nodes do not need to make frequent route changing and therefore, transmit fewer control messages that may interfere with data packet transmission. As a result, nodes use more time and more bandwidth for data packet transmission, which, in turn, increases packet delivery rate. Accordingly, it is desirable to provide stability based routing metric not only for RPL routing protocol but for all routing procedures in wireless networks.

SUMMARY OF THE INVENTION

Various embodiments of the invention provide a method to discover stable routes in wireless networks for routing packets, in which data sinks and nodes form wireless mesh networks.

The embodiments use a routing metric called a stability index (SI). The SI characterizes the stability of the network topologies and the stability of routes. As a result, two types of SIs are defined: Destination Oriented Directed Acyclical Graph (DODAG) SI, and a node SI. The DODAG SI characterizes a stability of a network topology, and node SI characterizes the stability of the node. A stable route is composed of a relatively stable node at each hop along the route.

To determine the SI, a relationship between the node stability and control message transmission is used. A stable node transmits fewer control messages, while an unstable node transmits more control messages. Hence, the SI is a measure of a rate at which control message are transmitted. A lower SI a higher level of stability, while a higher SI characterizes less stable topology or node. The SI is determined by using passive technique, in which nodes only monitor control message received, from neighboring nodes. Thus, no communication overhead is incurred. As defined herein, a neighboring node is any transmitting node within radio range of a receiving node.

To save memory, only metadata are stored instead of control message, which can have a large size. A sliding time window and a timer are used to collect the metadata for accurate SI determination.

Stable routes increase the data packet delivery rate and reduce control message overhead. Therefore, the stability based routing metric according to embodiments of the invention improves reliability of routing procedures.

DETAILED DESCRIPTION OF THE PREFERRED EMBODIMENTS

Figure 1:
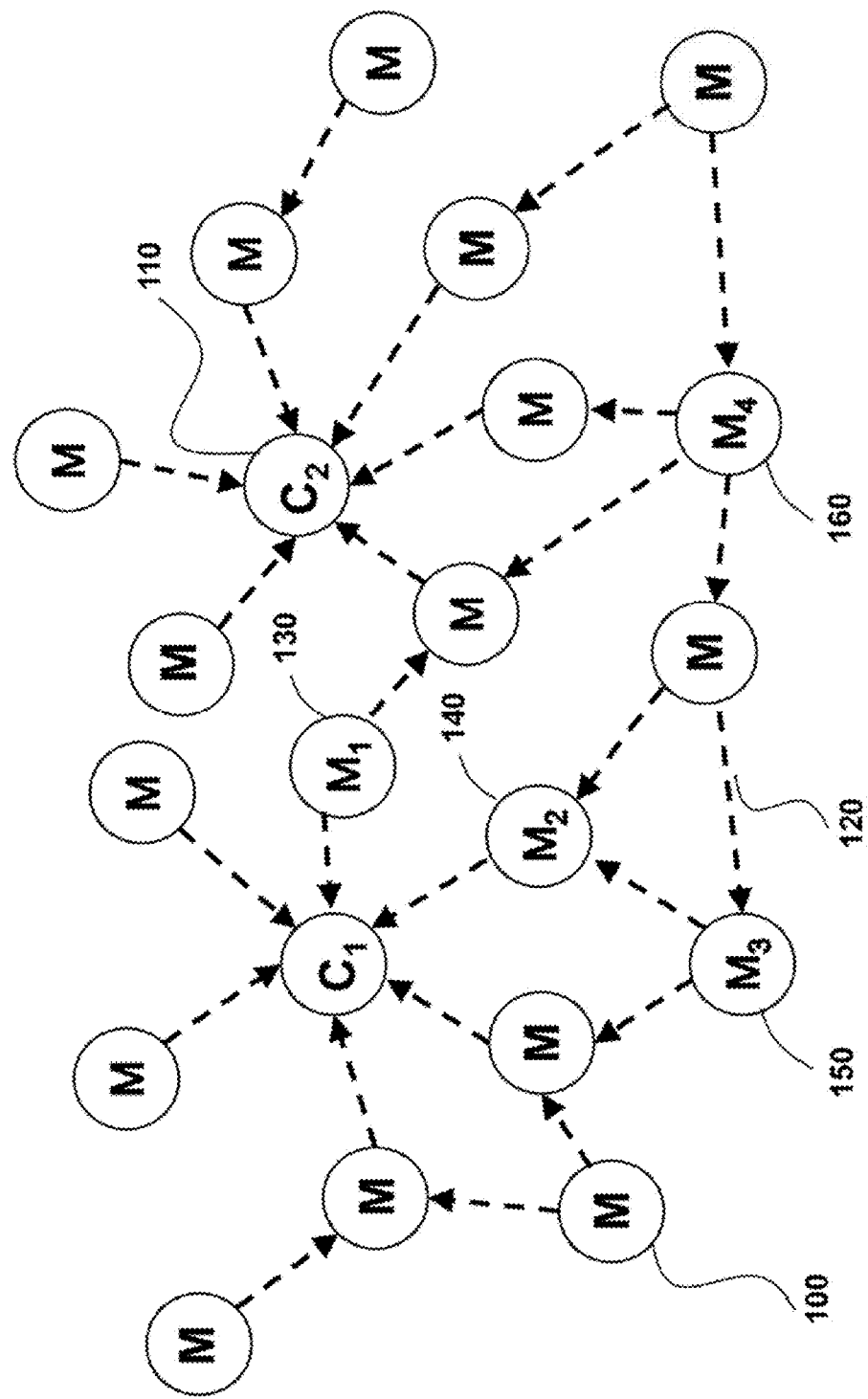
FIG. 1 is schematic of a smart meter network according to some embodiments of an invention.

FIG. 1 shows a schematic of an example of smart meter network that uses embodiments of the inventions. The network includes smart meter nodes (M) 100 and data concentrator nodes (C) 110. The nodes form a wireless mesh network using wireless links 120. The direction of the links indicates the general flow of data packets from smart meters (source node or sources) to concentrators (sink nodes or sinks), although control messages can be sent in either direction.

Some sources, e.g., 130 $M_1$ and 140 $M_2$, transmit data packets directly to sinks. Some of the sources, e.g., 150 $M_3$ and 160 $M_4$, cannot directly transmit data packets to any concentrators. Instead, the data packets are first transmitted to other sources intermediate or relay nodes, e.g., 140 $M_2$, which then relay the packets to sinks. In other words, data collection is conducted in a multi-hop manner. Hence, some source node as defined and referred to herein can either be a source node, or a relay node acting as an intermediary node for packets originating from other source nodes.

In addition, some smart meter nodes, e.g., 130 $M_1$ and 160 $M_4$, select one concentrator as a primary sink and select another concentrator as a backup sink. Some smart meter nodes, e.g., 150 $M_3$ and 160 $M_4$, select multiple routes to sinks.

Figure 2:
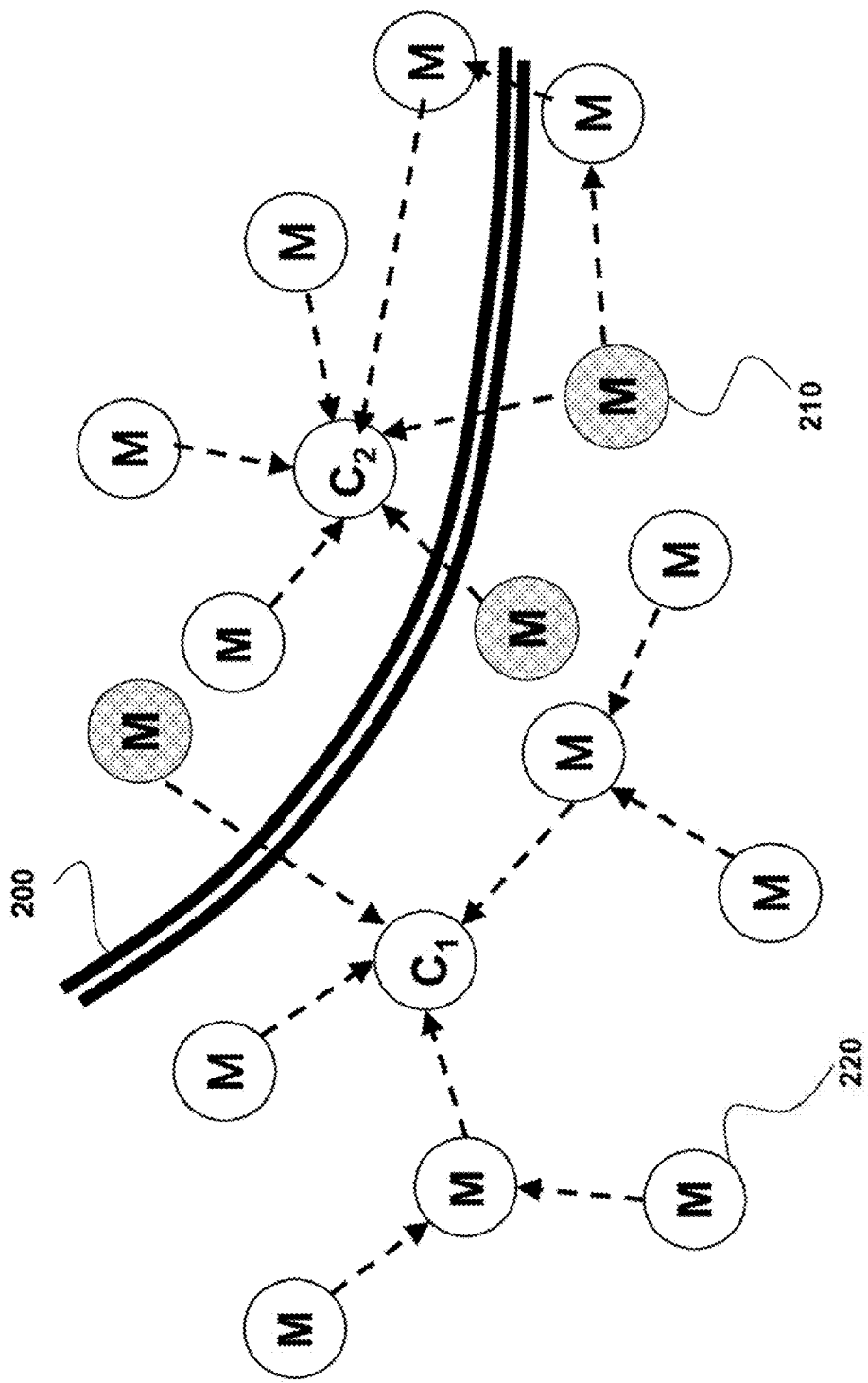
FIG. 2 is a schematic example of smart meter network with stable and unstable routes according to some embodiments of an invention.

FIG. 2 shows stable and unstable routes in a smart meter network. A busy road 200 passes through an area where the smart meter network is deployment. Interfering wireless signals from vehicle traffic on the road can makes routes for some smart meters 210 unstable, although other smart meters 220 farther from the interfering nodes may be part of stable routes. The invention maximizes the number of stable routes.

In wireless networks, routing procedures use control messages to discover routes from sources to sinks. For example, AODV and DSR use Route Request (RREQ) and Route Reply (RREP) messages to discover routes. The invention is based on the realization that nodes connected by stable routes transmit fewer RREQ messages. As a result, corresponding RREP message transmissions are also fewer. On the other hand, unstable routes transmit more RREQ messages and corresponding RREP messages. Therefore, the rate of control message transmissions can be used to measure route stability. The IETF RPL protocol is used as an example to describe how to discover stable routes according to embodiments of the invention by utilizing the rate of receiving control messages. However, embodiments of the invention can be applied to all routing procedures other than RPL.

RPL Overview

To design a scalable routing protocol for LLNs, the IETF ROLL WG has standardized RPL as RFC 6550. RPL is a routing protocol specially designed for LLNs. RPL organizes nodes in LLNs as a Directed Acyclic Graph (DAG) and partitions the DAG into one or more Destination Oriented DAGs (DODAGs). There is one DODAG per data sink. To construct the topology of the DODAG and upward routes from nodes to a data sink, the data sink acts as the root of the DODAG and broadcasts DODAG Information Object (DIO) messages to neighboring nodes. DIO messages contain the information to construct the DODAG. For example, three parameters of RPLInstanceID, DODAGID and DODAGVersionNumber are enclosed to identify a DODAG version.

The rank of a node defines the individual position of the node relative to other nodes with respect to the root of the DODAG. Nodes in the proximity of the data sink receive the DIO messages, determine their ranks when the nodes decide to join the DODAG, and transmit updated DIO messages to neighboring nodes, e.g., some other sources nodes acting as intermediary or rely nodes. The ranks of the nodes are contained in the DIO messages. DIO messages are propagated in all directions so that the DODAG topology is constructed in a wave front manner, until every node joins a DODAG. RPL uses Destination Advertisement Object (DAO) messages to build downward routes from data sink to other destinations. The DODAG Information Solicitation (DIS) message is used to solicit a DIO from a RPL node, that is, to discover new routes.

To achieve reliable routing, RPL allows a node to have multiple parents using the DODAG structure for determining the next hop for data packet forwarding. One of parents is selected as the preferred parent and others as backup parents. The preferred parent is used as default next hop for packet forwarding. If the preferred parent is unavailable, then the backup parents can be used. RPL uses Objective Functions (OF) for assisting nodes to determine ranks and select parents.

Stability

While several routing metrics are specified in OFs, such as hop count and link quality, a metric that characterizes the stability of nodes and routes is not specified in any known RPL. In the wireless communication, a node with unstable connectivity may not be a satisfactory parent, even when near the destination (i.e., having a low rank). Data packets forwarded to unstable nodes are queued until route recovers, or even worse, the packets can be dropped due to a limited size queuing buffer. In either case, packet forwarding is delayed and overhead is increased.

Stability Characteristics of RPL Nodes and Routes

Routes composed of stable nodes are more stable. Therefore, to construct stable routes, each node in the network needs to select stable nodes as next hop nodes i.e., some neighboring parent nodes that act as intermediary or relay nodes, which themselves can also be source nodes originating data packets.

The rate of transmissions of control messages DIS, DIO and DAO can imply the stability of nodes and the network. A DIS transmission indicates a node's intention to discover new routes. A DIO transmission indicates a node's route information change, or a solicitation from a neighboring node for discovering new route. A DAO indicates a node's route information change or route information change of another node in transmitting node's sub-DODAG. In combination transmission of control messages is closely related to the stability of nodes. Over a specified time, unstable nodes transmit more control messages and stable nodes transmit fewer control messages. In general, the rate of received control message is proportional to the stability.

Stability Routing Metric

In RPL, control messages of DIO, DIS and DAO are used to construct and maintain routes. Control message transmission indicates if a node is stable enough to be selected as parent, that is, next hop node (intermediary or relay node). For instance, forwarding packets to nodes that often transmit DIS messages might be inefficient because a high rate of DIS transmissions imply nodes losing connections frequently. Nodes transmitting DIO messages frequently or at a high rate may not be stable. These nodes probably have unstable neighboring nodes and may forward packets to an unstable next hop node.

To quantify stability, a Stability Index (SI) is used as a metric. A node can maintain two types of SIs, DODAG SI and node SI. The DODAG SI characterizes the stability of the DODAG, while the node SI characterizes the stability of the node. Based on the two types of SIs, a node first selects the most stable DODAG to join and then selects more stable nodes in the DODAG as its parents.

Figure 3:
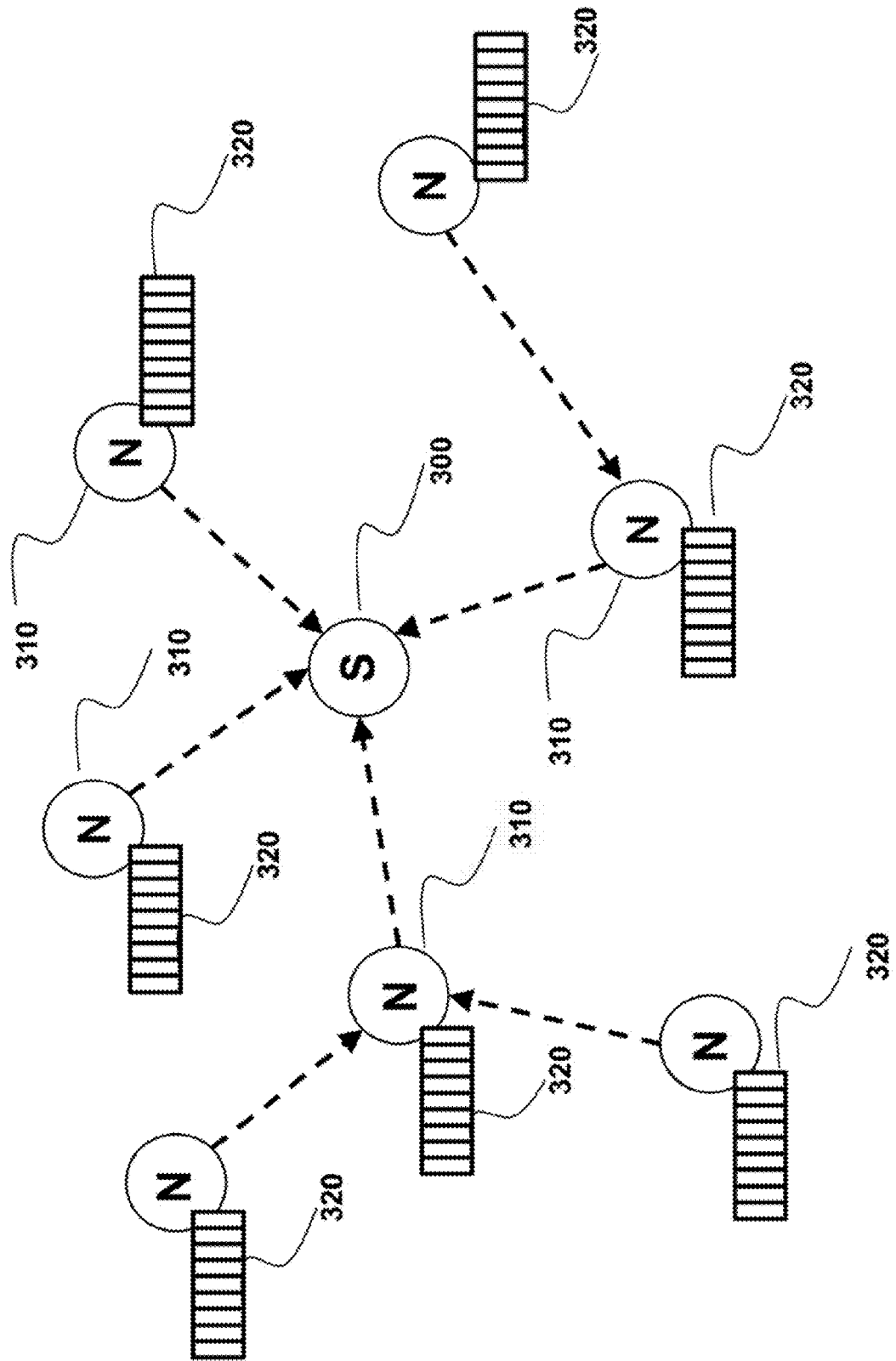
FIG. 3 is a schematic of example sliding time windows maintained by each node for control message recording according to some embodiments of an invention.

As shown in FIG. 3, to determine the SIs of other nodes at any node 310, a sliding time window W 320 is used at the node 310 to determine the rate of received control messages from neighboring nodes. Thus, at any time, the sliding window generally indicates the rate of receiving the control messages for a current time period.

For memory efficiency purpose, a node only records control messages received from neighboring nodes of interest. As defined herein, a neighboring node is any node within radio range of a receiving node.

In RPL, control messages are large in size. To reduce memory usage, instead of storing entire control message into the W, only metadata of the control message are recorded in the W. To determine the DODAG SI, metadata {Transmiter_ID, Message_Type, Timestamp RPLInstanceID, DODAGID, ODAGVersionNumber} are recorded. To determine node SI, metadata {Transmiter_ID, Message_Type, Timestamp} are recorded.

The records are organized in an ascending order according to time. Each node maintains its W independently as shown in FIG. 3, in which sink (S) 300 collect data packets from nodes 310, and each node maintains the window W 320.

In one embodiment, the W 320 is of a fixed size. In another embodiment, the W is time based, and a node records the received control messages for a recent past time period, e.g., 60 seconds, no matter how much memory is used. A size based W has the advantage of memory efficiency. However, a burst of control message transmissions by a neighboring node can rapidly fill the W. Time based W records all control messages received. However, this may use up a node's memory.

A node counts the control message to determine the rate the control messages are received. The node uses records in W 320 to calculate the rate the control messages are received for its neighboring nodes. The node maintains a DIS recorder, a DIO recorder and a DAO recorder to record timestamps of control messages transmitted by the node itself. Each time, a node transmits control message DIS or DIO or DAO, a timestamp is added to the corresponding recorder. The recorders are used to calculate the rate the control messages are transmitted by the node itself. In addition to the W and control message recorders, a timer is used to periodically refresh records in the W, and the control message recorders.

Figure 4:
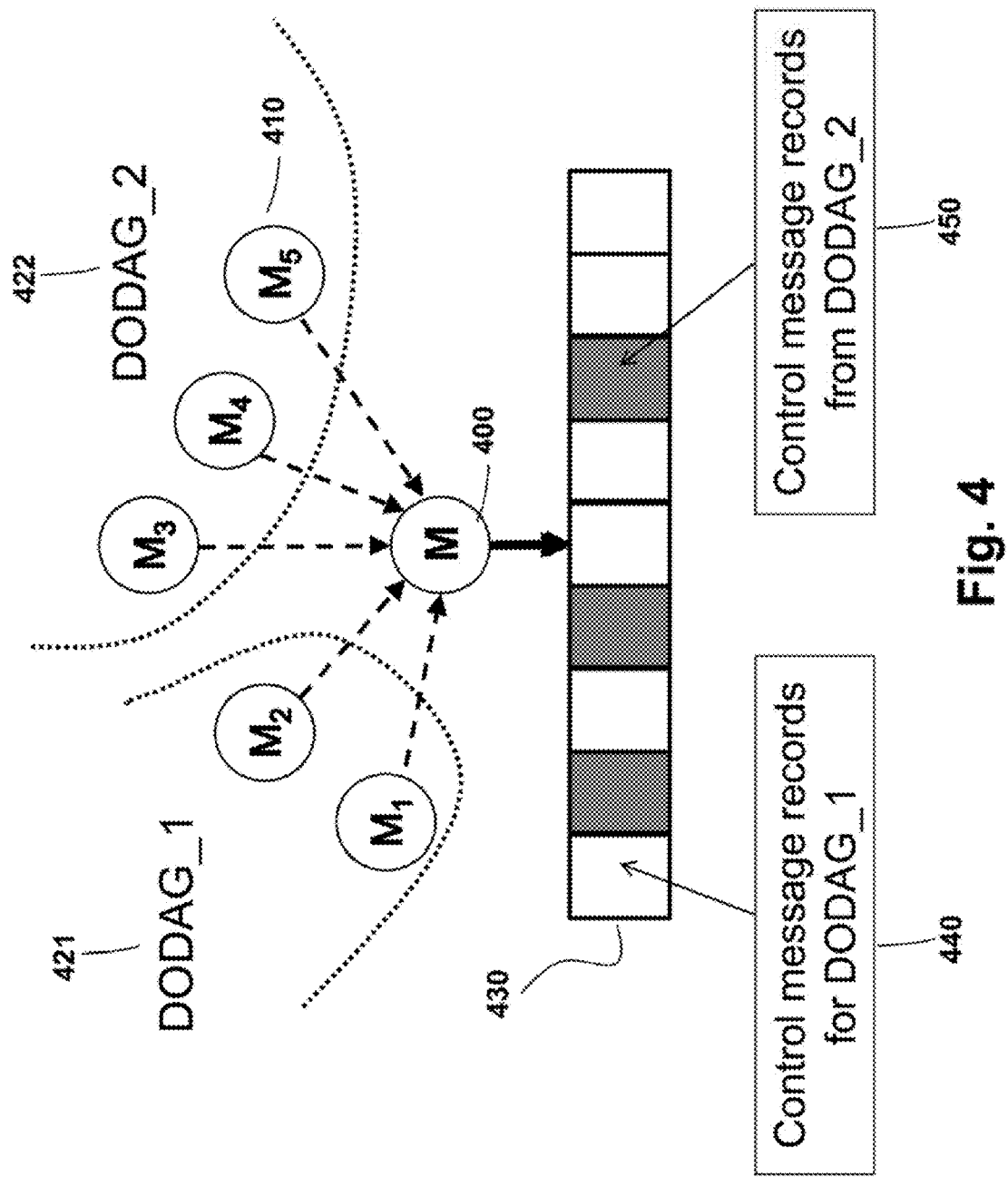
FIG. 4 is a schematic of an example of a node recording control messages transmitted by neighboring nodes in different DODAGs to determine stability indices for different DODAGs according to some embodiments of an invention.

FIG. 4 shows a LLN with multiple DODAGs organized according to multiple data sinks. Different nodes can select to join different DODAGs. For example, node 400 M has five neighboring nodes 410 $M_1$, $M_2$, $M_3$, $M_4$, and $M_5$. Nodes $M_1$ and $M_2$ are joined in DODAG_1 421, and other three neighboring nodes are joined DODAG_2 422. Node M records metadata from control messages 440 from DODAG_1 and metadata from control messages 450 from DODAG_2 into its window W 430. A node can determine the SI for the interested DODAG. Suppose nodes $M_1$, $M_2$, . . . , $M_n$ are neighboring nodes of a node M and nodes $M_1$, $M_2$, . . . , $M_n$ joined the same DODAG_G. Then, node M can determine the SI for DODAG_G by passively monitoring control message received from nodes $M_1$ $M_2$, . . . , $M_n$.

If node M is not a member of DODAG_G, then node M determines the SI for DODAG_G as follows $$SI_M^{DODAG\_G} = \frac{\sum_{i=1}^{i=n}(W_{DIS} \times N_{DIS}^i + W_{DIO} \times N_{DIO}^i + W_{DAO} \times N_{DAO}^i)}{n \times T} \quad (1)$$

where $W_{DIS}$, $W_{DIO}$ and $W_{DAO}$ are non-negative weights according to an importance of the DIS, DIO and DAO messages with respect to stability, respectively, and $N_{DIS}^i$, $N_{DIO}^i$ and $N_{DAO}^i$ are the numbers of DIS, DIO, and DAO messages received from node $M_i$ (1≤i≤n) by node M, respectively, and T is the length of time period used to determine the rate of control messages received or transmitted. T is independent from the length of time period used to refresh the window W and the recorders.

If node M is a member of DODAG_G, node M determines the SI of DODAG_G SI as follows $$SI_M^{DODAG\_G} = \frac{W_{DIS} \times C_{DIS}^M + W_{DIO} \times C_{DIO}^M + W_{DAO} \times C_{DAO}^M}{(n+1) \times T} + \frac{\sum_{i=1}^{i=n}(W_{DIS} \times N_{DIS}^i + W_{DIO} \times N_{DIO}^i + W_{DAO} \times N_{DAO}^i)}{(n+1) \times T} \quad (2)$$

where $C_{DIS}^M$, $C_{DIO}^M$ and $C_{DAO}^M$ are the numbers of DIS, DIO, and DAO messages transmitted by node M and obtained by counting number of timestamps in the corresponding recorders, respectively. Other variables are same as in equation (1).

Within a specific DODAG, a node can determine the SI for itself or neighboring nodes. A node M determines its own SI as follows $$SI_M = \frac{W_{DIS} \times C_{DIS}^M + W_{DIO} \times C_{DIO}^M + W_{DAO} \times C_{DAO}^M}{T} \quad (3)$$

where $C_{DIS}^M$, $C_{DIO}^M$ and $C_{DAO}^M$ are same as in equation (2). $W_{DIS}$, $W_{DIO}$ and $W_{DAO}$ have same meanings as those in equation (1) but can have different values. T has same meaning as in equation (1).

A node can determine its SI using equation (3) and includes its SI in a packet to let its neighboring nodes know its SI. However, this method increases overhead in the network work. In order to reduce this overhead, a passive SI measurement method is introduced to let a node measure the SIs for its neighboring nodes instead of transmitting their SIs by neighboring nodes. With passive SI measurement, a node only monitors control message received from its neighboring nodes and records metadata in its window W 320. The node then uses the records in the window W to determine the SIs for the neighboring nodes.

Let node P be a neighboring node of the node M, node M measures node P's SI as follows $$SI_M^P = \frac{W_{DIS} \times N_{DIS}^P + W_{DIO} \times N_{DIO}^P + W_{DAO} \times N_{DAO}^P}{T} \quad (4)$$

where $N_{DIS}^P$, $N_{DIO}^P$ and $N_{DAO}^P$ are the numbers of DIS, DIO, and DAO messages received from node P by node M. $W_{DIS}$, $W_{DIO}$ and $W_{DAO}$ are same as in equation (3). T is also same as in equation (3).

Figure 5:
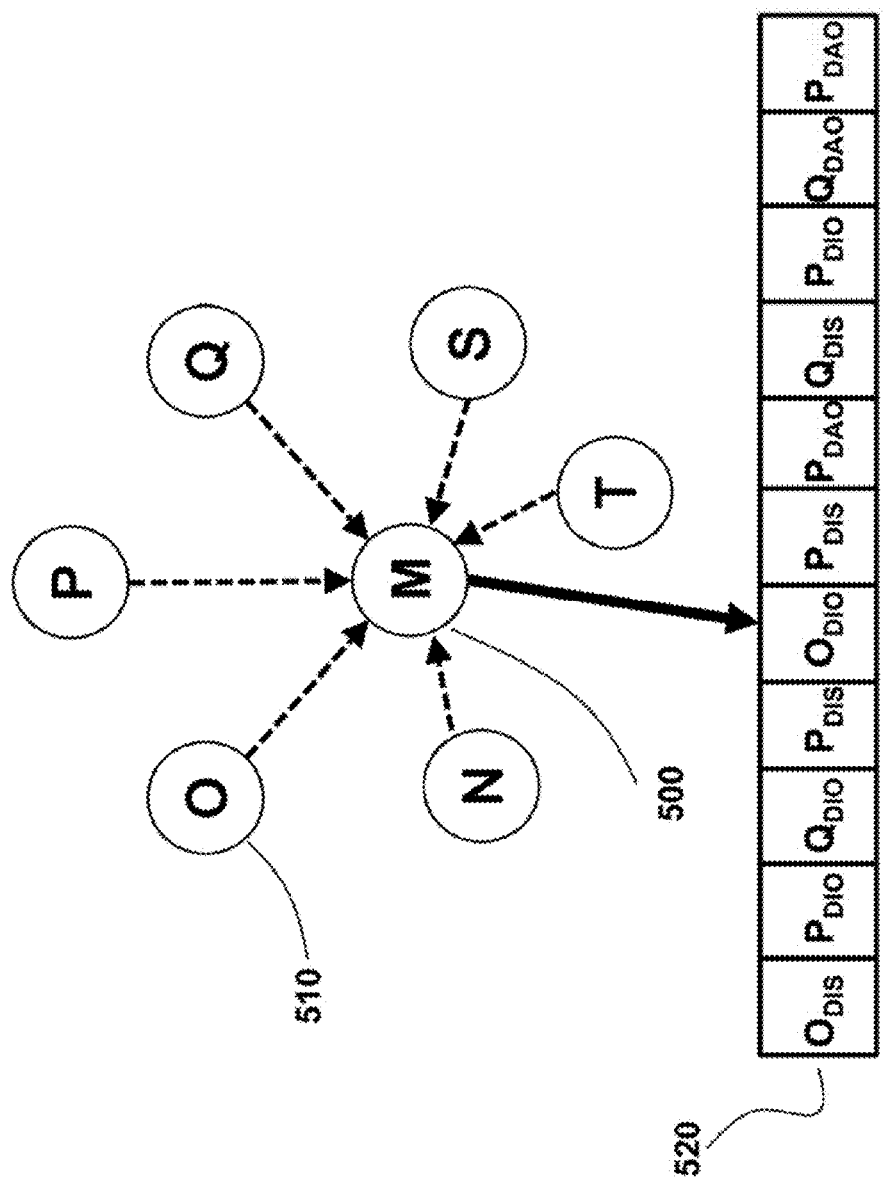
FIG. 5 is a schematic of an example of a node recording, in a sliding time window, control messages data received from neighboring nodes according to some embodiments of an invention.

FIG. 5 shows an example, in which node 500 M has six neighboring nodes 510 N, O, P, Q, S, and T. However, node M is only interested in neighboring nodes O, P, and Q. As a result, node M records control messages received from these three neighboring nodes into its W 520. Using records in its W, node M determines the SI for its neighboring node P as $SI_M^P = (2W_{DIS} + 2W_{DIO} + 2W_{DAO})/T$. To determine the SI accurately, besides the W and control message recorders, a node maintains a Timer. The node uses the timer to refresh its window W and control message recorders by deleting stale records.

Figure 6:
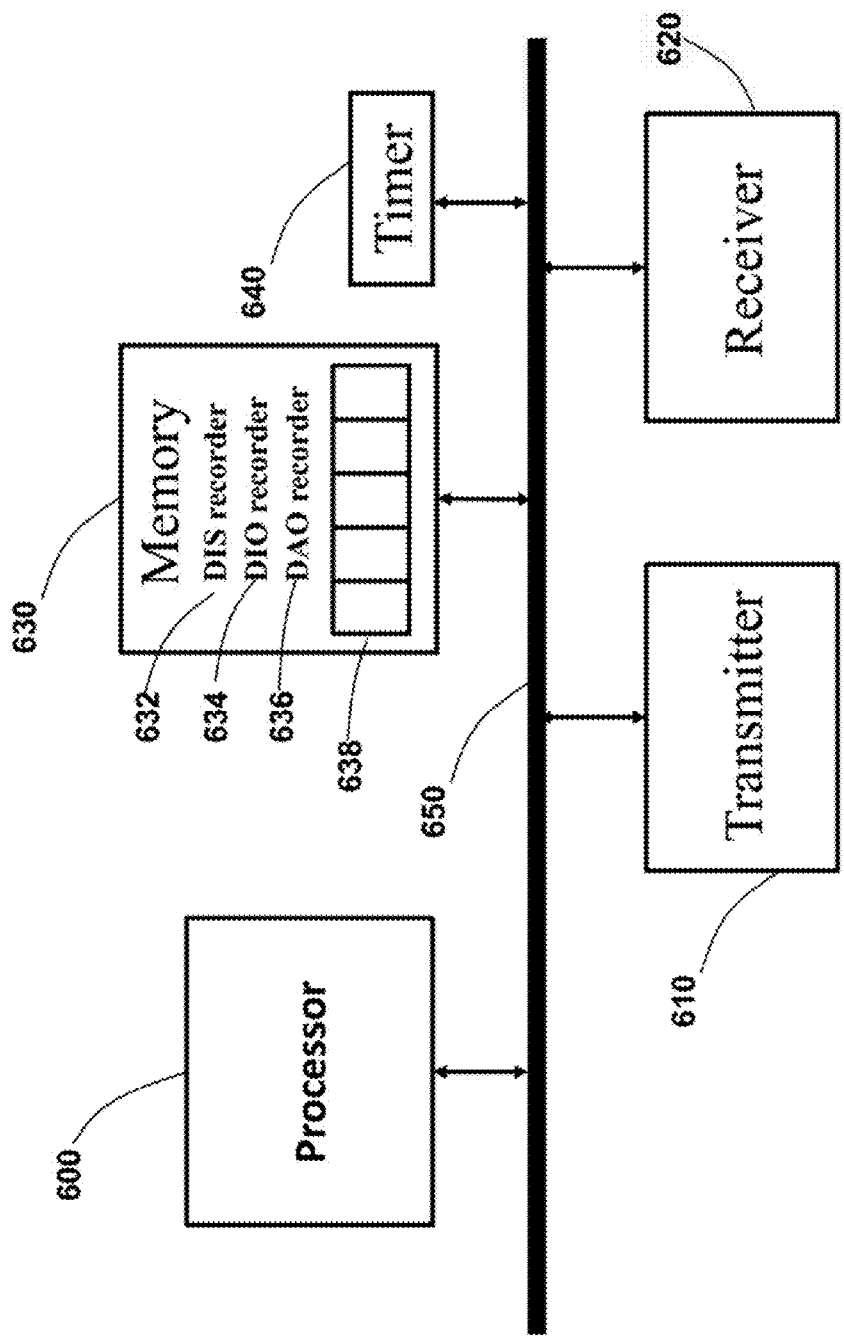
FIG. 6 is a schematic of s processor in a node for maintaining records for accurate stability index determination according to some embodiments of an invention.

FIG. 6 schematically shows a typical node. The node includes a processor 600, a transmitter 610, a receiver 620, a memory 630, a timer 640, and a bus 650 connecting all components. Memory is allocated for the DIS recorder 632, the DIO recorder 634, the DAO recorder 636, and the window W 638.

SI Routing Metric for RPL

The SI can be used by RPL nodes to select parents and determine ranks. The lower a node's SI, the more stable the node is. Therefore, a node typically selects neighboring nodes with lower SI values as parents for forwarding data packets.

After parents are selected, a node can determine a SI based rank. In RPL, the rank for a node M is defined as $$R(M) = R(P) + \text{Rank\_Increase} \quad (5)$$

where R(P) is the rank of the preferred parent and $$\text{Rank\_Increase} = C \times \text{MinHopRankIncrease}, \quad (6)$$

where rank increase coefficient C is an positive integer and $1 \le C \le 180$. For a node M, SI based rank is defined as $$R(M) = R(P) + f(SI_M) \times \text{MinHopRankIncrease} \quad (7)$$

where $f(SI_M)$ is a positive integer valued function, such that $1 \le f(SI_M) \le 180$ and $f(SI_M)$ increases as $SI_M$ increases.

Figure 7:
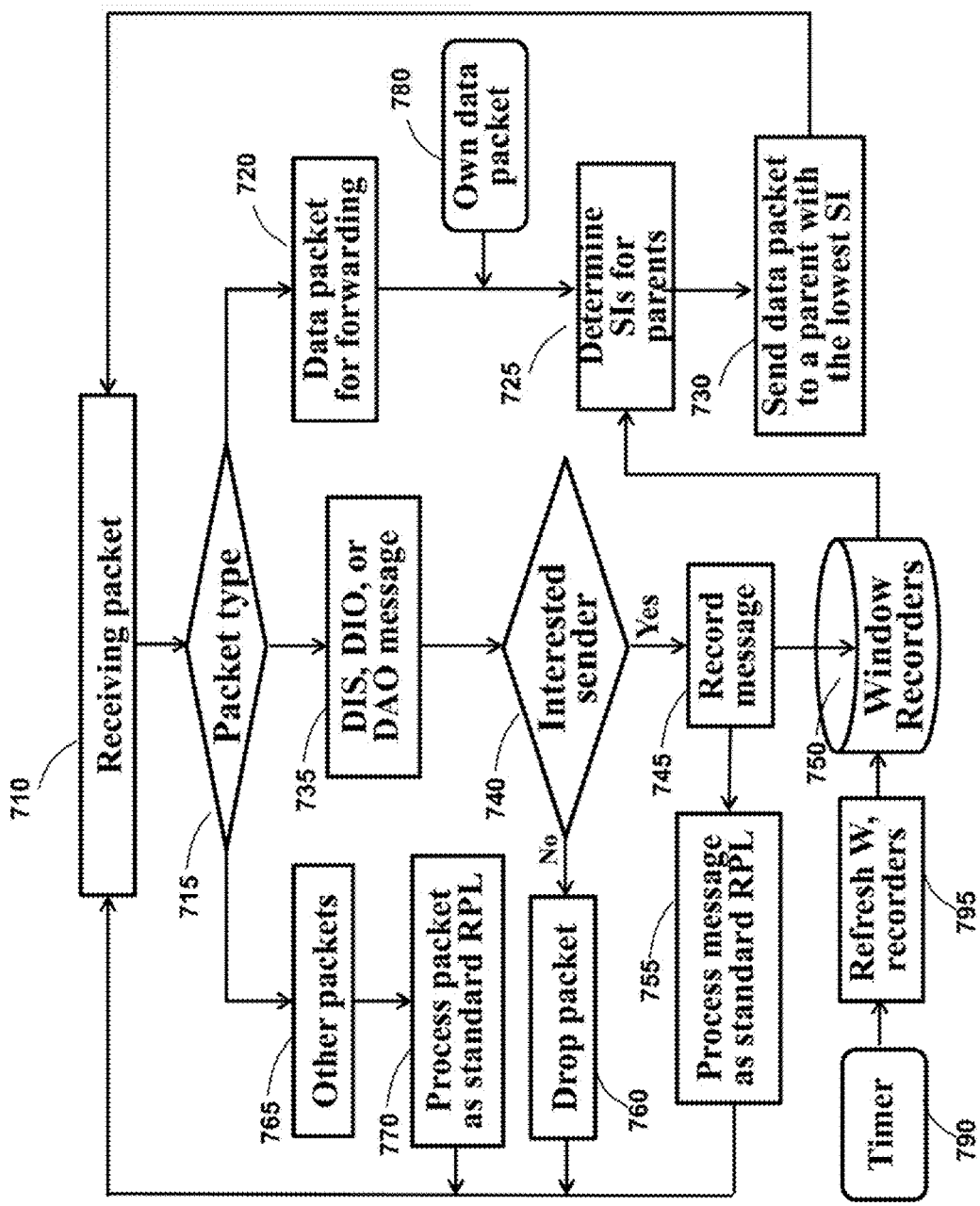
FIG. 7 is a flow diagram of processing received messages transmitted by neighboring nodes according to some embodiments of an invention.

FIG. 7 shows a procedure used by a node after receiving a packet 710. First, the node determines 715 the type of the packet. If the packet is a data packet 720 to be forwarded, then the node determines 725 the SIs for all its parents by using records in the W 750, and forwards the data packet 730 to its parent with the lowest SI value, i.e., the most stable parent. If the packet is a control message 735 of DIS, DIO or DAO, the node determines 740 if the control message was transmitted by neighboring node of interest. If yes, the node records 745 the metadata of the message into the window W 750 and then processes 755 the control message following the RPL standard. If no, the node drops 760 the control message. If the received packet is another packet 765 (e.g., not intended for the node), the node processes 770 the packet by following standard RPL rules. In addition, a node has its own data packet to transmit 780. To do so, the node determines 725 the SIs for all its parents by using records in the W 750 and forwards the data packet 730 to its parent with the lowest SI value, i.e., the most stable parent. If the timer 790 expires, the node refreshes 795 the window and recorders 750 by deleting old records.

Using SI with Other Routing Metrics

The SI can be combined with other routing metrics, such as hop count or link quality. In this case, the rank computation is based on other routing metrics and the SI is used to select the most stable parents for data packet forwarding. Followings are some examples of using the SI with the hop count as an example metric:

1. A node selects parents and determines rank only based on the hop count. However, during packet transmission, the node selects a parent with the lowest SI as a next hop, not necessarily using the preferred parent;
2. The node first selects candidate parents based on the SI, and then selects parents among parent candidates using hop count metric and determines the rank based on the hop count; and
3. The node first selects parent candidates based on hop count, and among parent candidates, the node selects parent candidates using the SI metric. However, the node determines the rank based on the hop count.

Other use cases of SI are also possible.

Comparing SI with Other Routing Metrics

Figure 8:
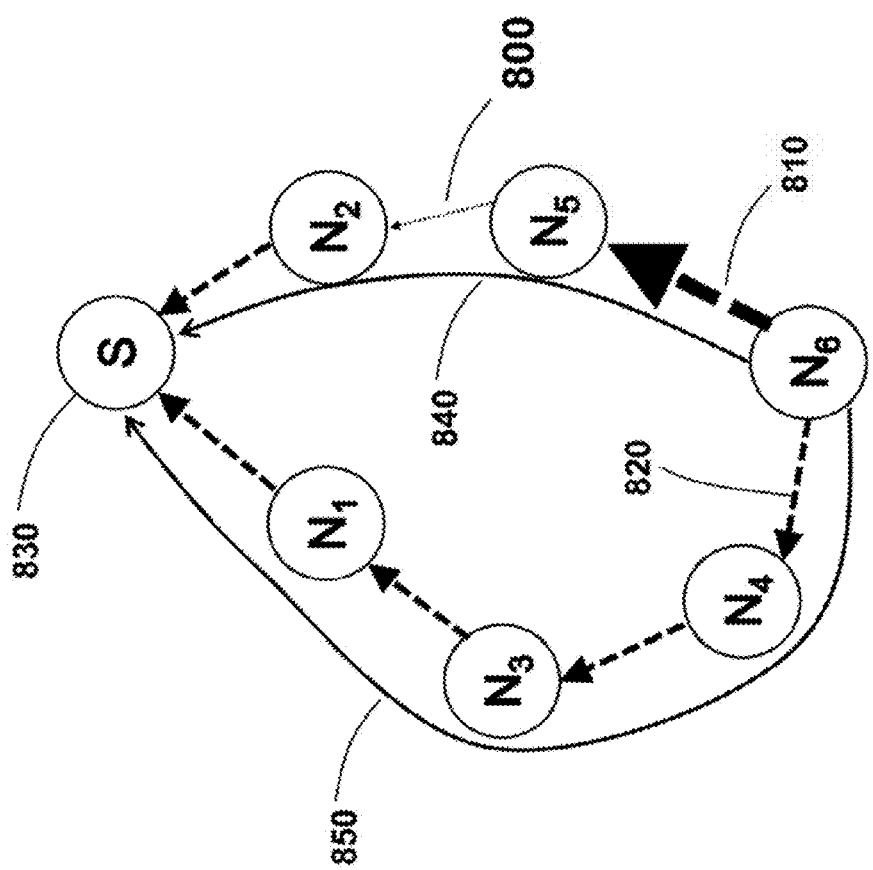
FIG. 8 is a schematic of an example stability index metric for improve the reliability of routes.

FIG. 8 shows an example where the SI metric outperforms a conventional hop count (HC) metric and an expected transmission count (ETX) metric. There is an unstable link 800 from node $N_5$ to node $N_2$ and a very stable link 810 from node $N_6$ to $N_5$. The rest of the links 820 are reasonably stable. Node $N_6$ needs to transmit a data packet to sink 830 S. Using the HC metric, node $N_6$ selects route 840 $N_6 \rightarrow N_5 \rightarrow N_2 \rightarrow S$ because this is the shortest route. Using the ETX metric, node $N_6$ also selects route 840 because link 810 is better than link 820. However, due to the unstable link 800, route 840 is not an optimal route. The problem is that node $N_6$ does not know unstable links on the route in the conventional approach. However, using the SI metric, this can be avoided. Because link 800 is unstable, node $N_5$ transmits more control messages to maintain the route. Node $N_6$ receives the control messages from node $N_5$ and records in its W. To transmit packet, node $N_6$ selects route 850 $N_6 \rightarrow N_4 \rightarrow N_3 \rightarrow N_1 \rightarrow S$ because node $N_4$ has a lower SI than node $N_6$'s SI. In other words, SI provides a better route 850.

To evaluate if the newly introduced SI routing metric can provide stable routes and improve performance of routing procedures, two commonly used routing metrics HC and ETX are used for comparison.

Figure 9:
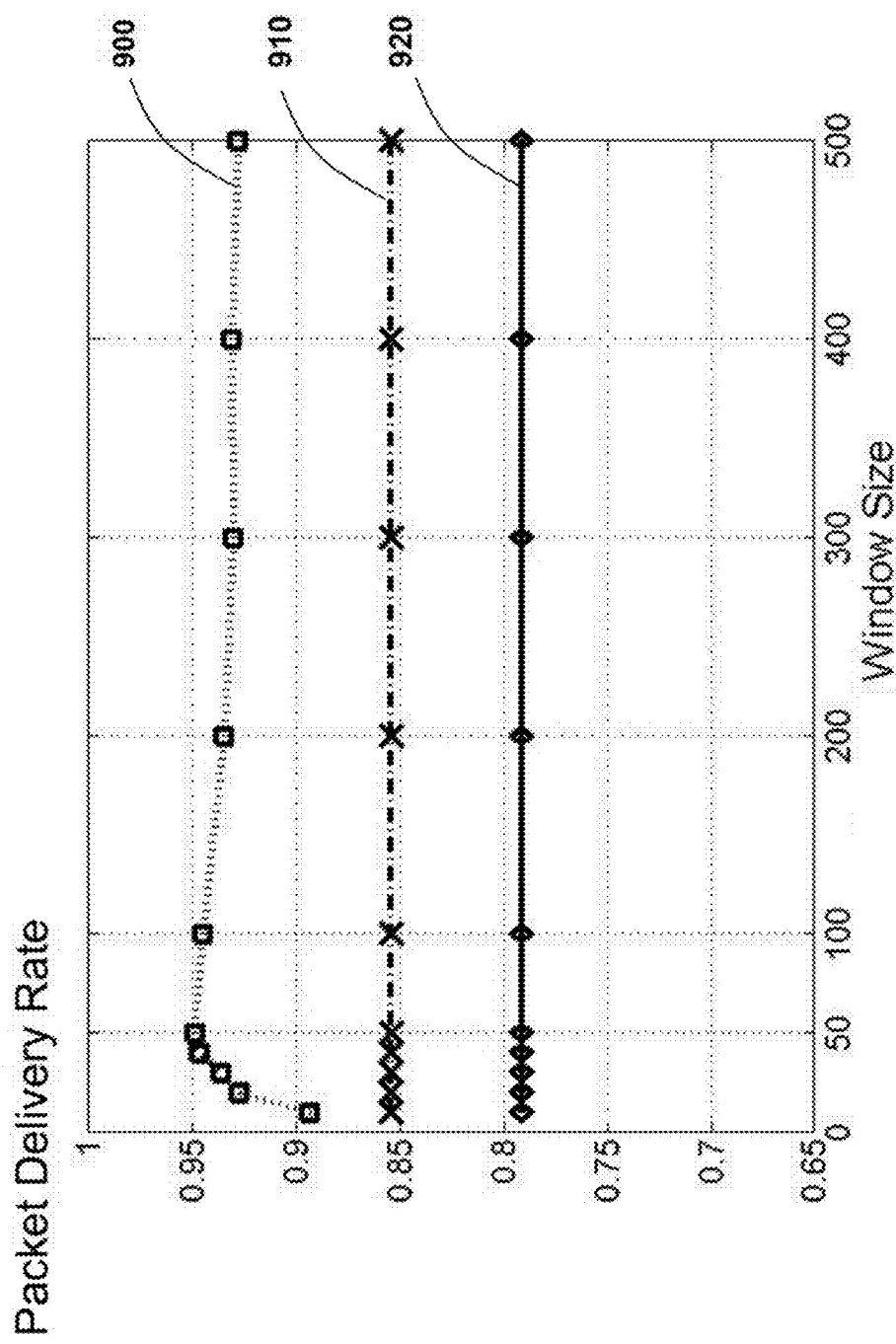
FIG. 9 is a graph of packet delivery rate as a function of window size various routing metrics.

FIG. 9 shows SI metric 900 provides the highest packet delivery rate, ETX metric 910 performs in between SI metric and HC metric 920, which has the lowest packet delivery rate. Because HC and ETX metrics do not involve window W, the corresponding curves are plotted as straight lines.

Figure 10:
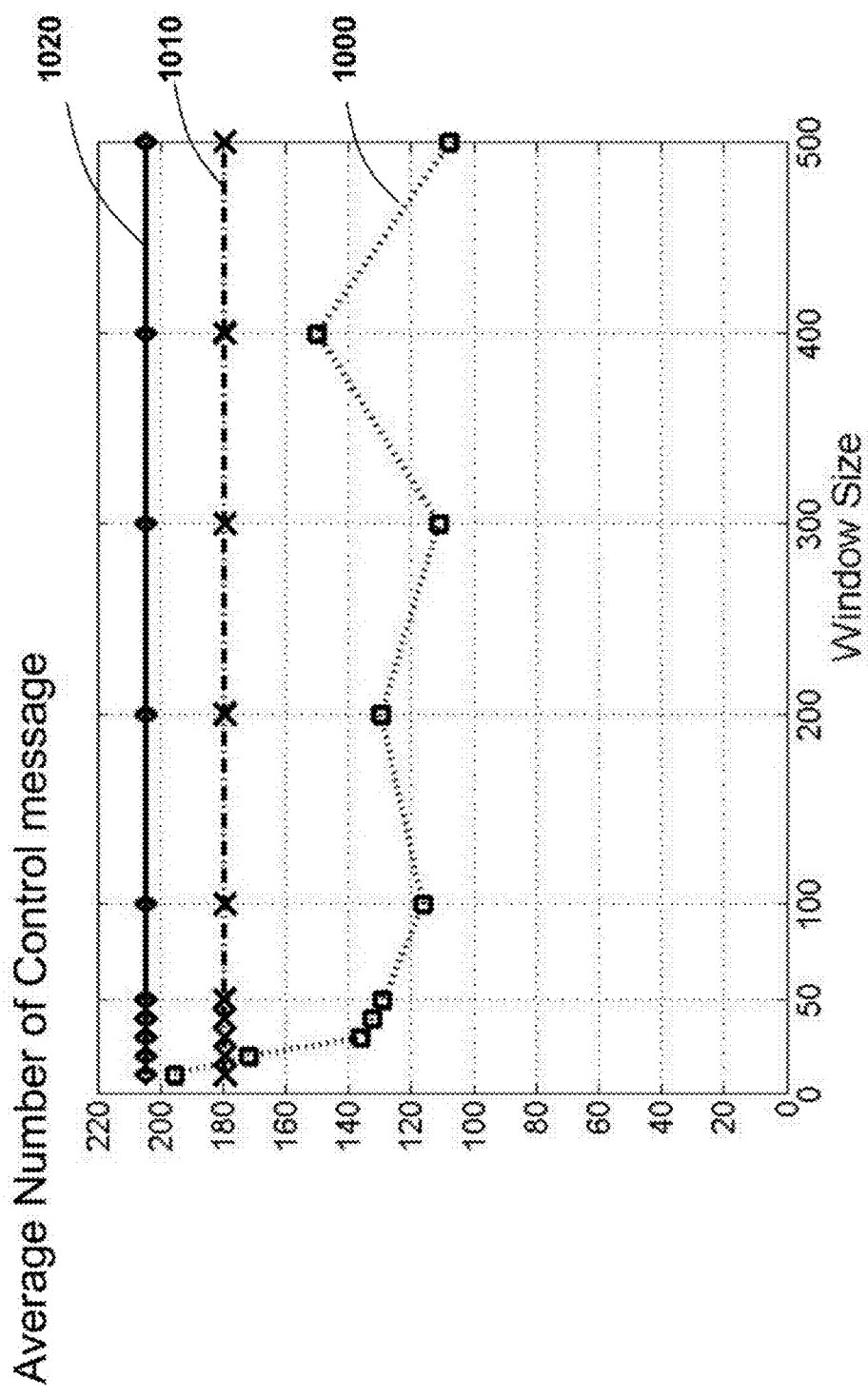
FIG. 10 is a graph of average number of control message transmission as a function of window size for various metrics.

In terms of control messages overhead, FIG. 10 shows SI metric 1000 has the lowest control message overhead. Again, ETX metric 1010 performs in between SI metric and HC metric 1020, which has the highest control message overhead.

Advantages of SI Metric

The SI measurement mechanism has several advantages:
1. Scalable: SIs are determined by each node independently, and the computation is based on each node's local analysis of neighboring nodes or DODAGs. No global information is needed.
2. Passive: Nodes determine the SIs by monitoring the control message received from neighboring nodes. There is no information exchange between nodes.
3. Low overhead: Computation of the SIs does not incur an communication overhead to the network, and nodes only needs to maintain a sliding window and control message recorders.
4. Adaptive: the SI metric can be used with other metrics, in which a node may or may not implement the SI in calculating routes and only uses SI for data packet forwarding.
5. Dynamic: SIs are determined dynamically when a node has a data packet to transmit or wants to switch DODAG.
6. Independent: Computation of the SIs is independent from any other protocols or layers, and only information from RPL is used. Computation of the SIs does not require any modification to RPL protocol.
7. Reliable: SI metric provides higher packet delivery rate and lower control message overhead compared with existing routing metrics.

Although the invention has been described by way of examples of preferred embodiments, it is to be understood that various other adaptations and modifications can be made within the spirit and scope of the invention. Therefore, it is the object of the appended s to cover all such variations and modifications as come within the true spirit and scope of the invention.

We claim:

1. A method for discovering routes to forward data packets from source nodes (sources) to sink nodes (sinks) in a wireless network, wherein some neighboring sources act as relay nodes, comprising the steps of:

measuring in each source, a rate of receiving control messages from each neighboring node, wherein the rate of receiving control messages ($SI_M$) from a neighboring node (M) is measured as a weighted-number of the control messages received within a sliding time window (T) from the neighboring node M according to $$SI_M = \frac{W_{DIS} \times C_{DIS}^M + W_{DIO} \times C_{DIO}^M + W_{DAO} \times C_{DAO}^M}{T},$$

wherein $C_{DIO}^M$ is a number of Destination Oriented Directed Acyclic Graph (DODAG) Information Object (DIO) messages received from the neighboring node M, and $C_{DAO}^M$ is a number of destination advertisement object (DAO) messages received from the neighboring node M, $C_{DIS}^M$ is a number of DODAG Information Solicitation (DIS) messages received from the neighboring node M, and wherein $W_{DIS}$, $W_{DIO}$ and $W_{DAO}$ are non-negative weights; and forwarding the data packets from a particular source to a particular sink via the neighboring node having the lowest rate of receiving control messages.

2. The method of claim 1, wherein the sliding time window has a fixed size, and newly received metadata overwrite old metadata when the sliding time window is full.

3. The method of claim 1, wherein the sliding time window records metadata for a recent past time period.

4. The method of claim 1, wherein each source includes a timer for updating the sliding time window.

5. The method of claim 1, further comprising:
determine a rank for each source, wherein the rank is based on a stability index of the routes.

6. The method of claim 5, further comprising:
forwarding the data packets from the particular source to the particular sink via the neighboring nodes having a lowest packet delivery rate and a lowest rank.

7. The method of claim 1, wherein the rates of receiving control messages are measured dynamically when forwarding the data packets.

8. The method of claim 1, wherein the rate of receiving control messages measures a stability of the sources.

9. The method of claim 1, wherein sources and sinks are organized as a Destination Oriented Directed Acyclic Graph topology.

10. The method of claim 1, wherein the wireless network is a low-power, lossy mesh network.

* * * * *